US011132880B2

(12) United States Patent
Hoang et al.

(10) Patent No.: US 11,132,880 B2
(45) Date of Patent: Sep. 28, 2021

(54) SYSTEM FOR TRACKING THE LOCATION OF PEOPLE

(71) Applicant: i3 America Nevada Inc., Scarborough (CA)

(72) Inventors: Andrew Hoang, Scarborough (CA); Jack Hoang, Scarborough (CA)

(73) Assignee: I3 AMERICA NEVADA INC., Scarborough (CA)

( * ) Notice: Subject to any disclaimer, the term of this patent is extended or adjusted under 35 U.S.C. 154(b) by 0 days.

(21) Appl. No.: 16/106,860

(22) Filed: Aug. 21, 2018

(65) Prior Publication Data

US 2019/0073883 A1    Mar. 7, 2019

(30) Foreign Application Priority Data

Sep. 5, 2017  (CA) ...................................... 2978418

(51) Int. Cl.
| | |
|---|---|
| *H04W 4/029* | (2018.01) |
| *G08B 13/196* | (2006.01) |
| *G08B 25/08* | (2006.01) |
| *G08B 13/19* | (2006.01) |
| *G01S 5/00* | (2006.01) |
| *H04W 4/021* | (2018.01) |
| *G01S 5/16* | (2006.01) |

(52) U.S. Cl.
CPC .......... *G08B 13/19608* (2013.01); *G01S 5/00* (2013.01); *G01S 5/16* (2013.01); *G08B 13/19* (2013.01); *G08B 13/196* (2013.01); *G08B 13/1966* (2013.01); *G08B 13/19645* (2013.01); *G08B 25/08* (2013.01); *H04W 4/021* (2013.01); *H04W 4/029* (2018.02)

(58) Field of Classification Search
CPC ........ G08B 13/19608; G08B 13/19645; G08B 25/08; G08B 13/1966; G01S 5/00; H04W 4/021; H04W 4/029
See application file for complete search history.

(56) References Cited

U.S. PATENT DOCUMENTS

| | | | |
|---|---|---|---|
| 8,615,254 B2 | 12/2013 | Jamtgaard et al. | |
| 9,124,778 B1 * | 9/2015 | Crabtree | ................... H04N 7/18 |
| 9,693,181 B1 | 6/2017 | Albouyeh et al. | |
| | (Continued) | | |

FOREIGN PATENT DOCUMENTS

WO     2012024516 A2    2/2012

*Primary Examiner* — Dave Czekaj
*Assistant Examiner* — Berteau Joisil
(74) *Attorney, Agent, or Firm* — Kagan Binder, PLLC

(57) ABSTRACT

A system for tracking the location of people as the people move between zones, the system including tracking devices and a central tracking system. The tracking devices each monitor a zone and include a video camera, infrared sensors for detecting people in the zone, an antenna for detecting wireless signals from devices carried by people in the zone that provide unique device identifiers, a light and a processor that communicates with the central tracking system. The processor turns the light on when the infrared sensor detects a person in the zone and analyzes video data from the camera to determine the location of the person, which is sent to the central processor which creates a personal identifier for the person based on the unique identifier of a device carried by the person and tracks the person as the person moves between zones.

12 Claims, 7 Drawing Sheets

(56) References Cited

U.S. PATENT DOCUMENTS

| | | | |
|---|---|---|---|
| 2005/0027435 A1* | 2/2005 | Scheppmann | G06K 9/00785 |
| | | | 701/117 |
| 2008/0151055 A1 | 6/2008 | Elsemore | |
| 2013/0142381 A1 | 6/2013 | Field | |
| 2014/0134971 A1 | 5/2014 | Monks et al. | |
| 2015/0085111 A1 | 3/2015 | Lavery | |
| 2015/0160328 A1* | 6/2015 | Peinhardt | G01S 5/0036 |
| | | | 455/456.3 |
| 2015/0341599 A1 | 11/2015 | Carey | |
| 2016/0112835 A1* | 4/2016 | McConathy | H04W 4/021 |
| | | | 455/456.1 |
| 2018/0075593 A1* | 3/2018 | Wang | G06T 7/85 |
| 2019/0035242 A1* | 1/2019 | Vazirani | G08B 29/188 |

* cited by examiner

SYSTEM FOR TRACKING THE LOCATION OF PEOPLE

PRIORITY CLAIM

This application claims priority to Canadian application having Serial Number 2,978,418, filed on Sep. 5, 2017, which is incorporated herein by reference in its entirety.

FIELD OF THE INVENTION

The present invention relates generally to systems and methods for tracking the location of people, and more particularly to tracking the location of people carrying mobile devices and moving between zones using a device including a camera, wireless antenna, a passive infrared sensor and a light.

BACKGROUND OF THE INVENTION

Prior art systems have been inadequate in locating and tracking people in a given location. Various techniques have been used, such as monitoring a space with one or more cameras and analyzing video imagery of the space to identify people in the space by known video analytic techniques. Such an approach is subject to error because of issues such as inadequate lighting, having an incomplete view of a person because of obstacles between the person and the camera, and being able to properly segment a person from the scene, for example when the person is wearing clothing similar in color to the background. Identifying individuals in the space has been attempted by techniques such as facial recognition, however this is generally not reliable with existing technology. Other technologies such as infrared detectors have also been used. Of the various technologies, all are subject to various issues that cause them not to achieve an acceptable rate of detecting, identifying and accurately tracking people in a space.

SUMMARY OF THE INVENTION

The following presents a simplified summary of the disclosure in order to provide a basic understanding to the reader. This summary is not an extensive overview of the disclosure and it does not necessarily identify key/critical elements of the invention or delineate the scope of the invention. Its sole purpose is to present some concepts disclosed herein in a simplified form as a prelude to the more detailed description that is presented later.

The present invention provides a system for tracking the location of people as the people move between zones in a facility, such as a retail store or warehouse, where each person is carrying a mobile device. The system includes a central tracking system in electronic communication with multiple tracking devices. Each tracking device is designed to be placed in one of the zones to monitor the zone and to communicate electronically with the central tracking system. Each tracking device includes a tracking device processor, a digital video camera, at least one passive infrared sensor, an antenna, and a light. The digital video camera is configured to capture video data of the zone in which the tracking device is placed, and configured to transmit the video data to a tracking device processor. The passive infrared sensors are configured to detect the presence of a person in the zone. The antenna is configured to detect wireless signals transmitted by the mobile devices carried by the people located in the zone, and for each mobile device the wireless signal transmitted by the mobile device includes a unique identifier for the mobile device. The light is configured to illuminate the zone when the light is turned on. The tracking device processor configured to receive data from the digital video camera, the passive infrared sensor and the antenna, and to control the light. The tracking device processor is also configured to turn the light on when the passive infrared sensor detects the presence of a person in the zone, and to analyze the video data obtained by the digital video camera to determine the location of the person in the zone.

The central tracking system includes a central tracking processor in electronic communication with the tracking devices. For each tracking device, when the tracking device processor determines that a person has entered the zone of the tracking device, the tracking device processor transmits information to the central tracking processor indicating the presence of the person in the zone and indicating the unique identifier or identifiers of one or more mobile devices in the zone. The central tracking processor creates a personal identifier for the person in the zone based on the unique identifier or identifiers of the one or more mobile devices in the zone and tracks the person as the person moves between the zones.

When the tracking device processor determines that a person has left the zone of the tracking device, the tracking device processor may transmit information to the central tracking processor indicating that the person has left the zone and indicating the unique identifiers of any mobile devices remaining in the zone after the person left the zone.

The tracking device processor may turn on the light only if the light level in the zone is less than a predetermined level. The digital video camera preferably includes a photo cell sensor configured to measure the light level in the zone and determine whether the light level is below the predetermined level.

The tracking device processor may only turn on the light if the passive infrared sensors have detected the presence of a person in the zone but the tracking device processor cannot identify the person in the zone by analyzing the video data when the light is not turned on.

For each person, the personal identifier may be further based on video analytics produced by the tracking devices characterizing the person. For example, the video analytics comprise an estimate of the height of the person.

For each person, if multiple mobile devices, each having a unique identifier, are simultaneously present in a first zone when the person entered the first zone, and one or more of the unique mobile device identifiers were detected in the first zone before the person entered the first zone, then the personal identifier may be based only on unique mobile device identifiers that were not present in the first zone before the person entered the first zone.

For each person, if multiple mobile devices, each having a unique identifier, were present in a first zone when the person entered the first zone, and the tracking device in the first zone determines that one or more of the unique mobile device identifiers is no longer present in the first zone while the person remains in the first zone, then the personal identifier may be modified so that it is based only on unique mobile device identifiers that were present in the first zone while the person remained in the first zone.

The central tracking system further comprises a database containing multiple unique mobile device identifiers, each unique mobile device identifier being associated with a person's name. Then, when the central tracking processor receives information that a person has entered one of the zones and also receives information indicating the unique mobile device identifier associated with a person listed in the database has been detected in the zone, the personal identifier for the person may include the name of the person specified in the database associated with the unique mobile device identifier.

The tracking devices and the central tracking system may be connected to an Ethernet network, and the tracking devices may be powered by power over Ethernet (PoE).

The antenna may be a Wi-Fi antenna, and the wireless signals may be Wi-Fi signals sent periodically by smartphones, wherein each wireless signal comprises the media access control (MAC) address of the smartphone.

The light may include one or more light-emitting diodes (LEDs).

For each of the tracking devices, the tracking device processor may be further configured to transmit the video data to the central tracking system while the passive infrared sensors detect the presence of a person in the zone.

The central tracking system may be further configured to store the video data in a storage device.

The central tracking system may be further configured to selectively display the video data as the video data is received from each tracking device processor as specified by a user or according to pre-defined parameters.

The central tracking system may automatically display video data of one of the zones after the presence of a person has been detected in the zone and also display information derived from the personal identifier for the person.

Each of the tracking devices may also include a microphone for capturing audio data, and the digital video camera may then be further configured to transmit the audio data captured when corresponding video data is being captured to the tracking device processor along with the corresponding video data. Each tracking device processor may also be configured to transmit the audio data to the central tracking system along with the corresponding video data, and the central tracking system may be configured to play the audio data when the corresponding video data is displayed. Each of the tracking devices may also include a speaker, and the system may then configured to permit a user of the central tracking system to cause audio data to be played via the speaker of one or more of the tracking devices.

BRIEF DESCRIPTION OF THE DRAWINGS

In the drawings, solid lines represent physical and electronic connections between elements. Dashed lines represent the transmission of sound or electromagnetic radiation.

DETAILED DESCRIPTION OF THE INVENTION

Figure 1:
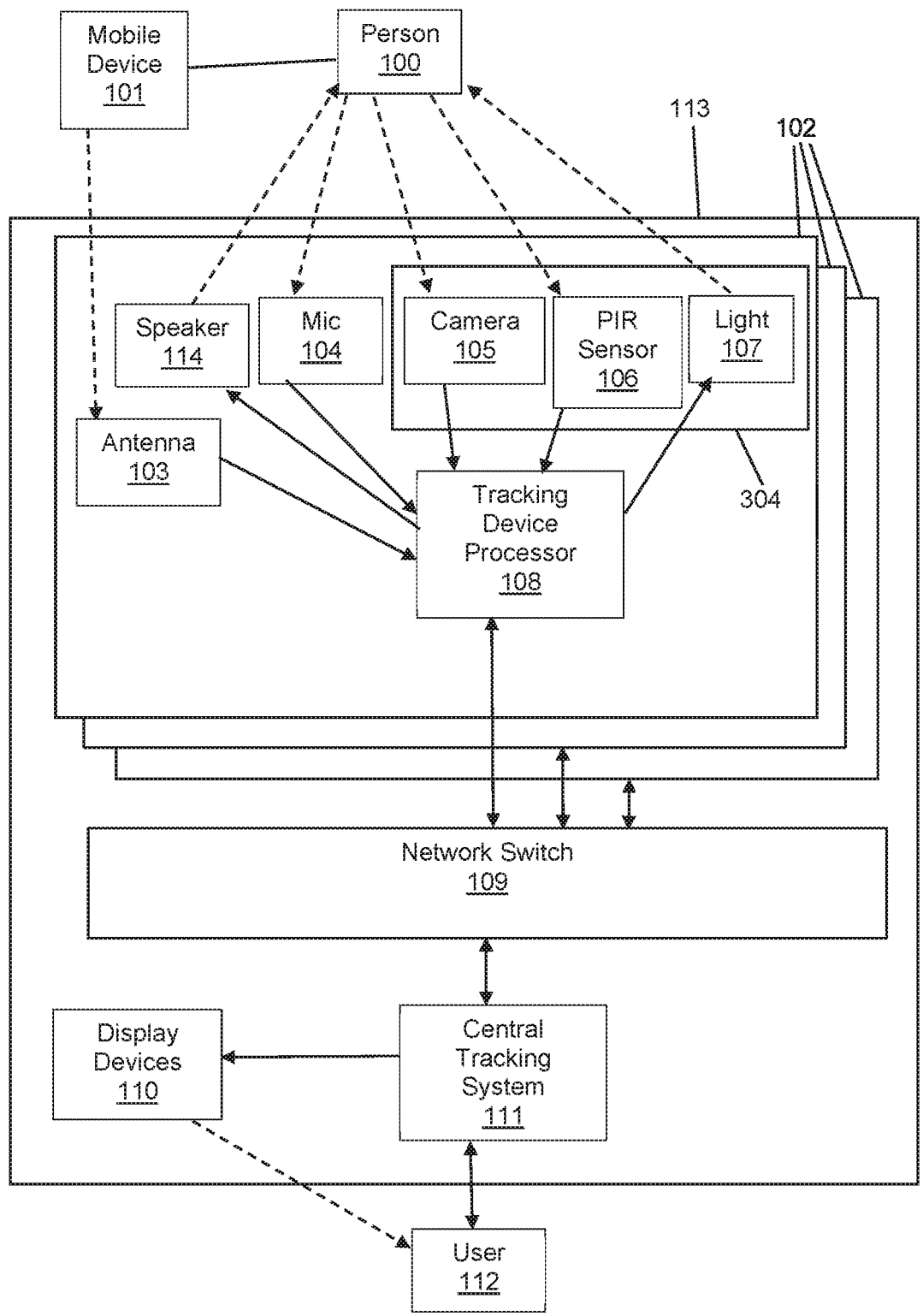
FIG. 1 is a functional black diagram showing a tracking device interacting with a person carrying a mobile device in a zone and interacting via a network with a central tracking system.

A functional block diagram of a preferred embodiment of the invention is shown in FIG. 1. The invention is a system 113 for tracking the location of people in a facility as the people move between zones of the facility, for example in a building with rooms, a warehouse or a large retail establishment. The zones preferably cover all the main areas in the facility in which people may be present. Zones may overlap, particularly in large facilities with extensive spaces without walls. The system 113 includes multiple tracking devices 102, all of which may be identical, connected via a network switch 109 to a central tracking system 111. The network may be a standard Ethernet network where the connected devices communicate electronically using Internet Protocol (IP) or any other suitable electronic network.

When installed in a facility, each tracking device 102 is located in one zone of the facility.

Figure 5:
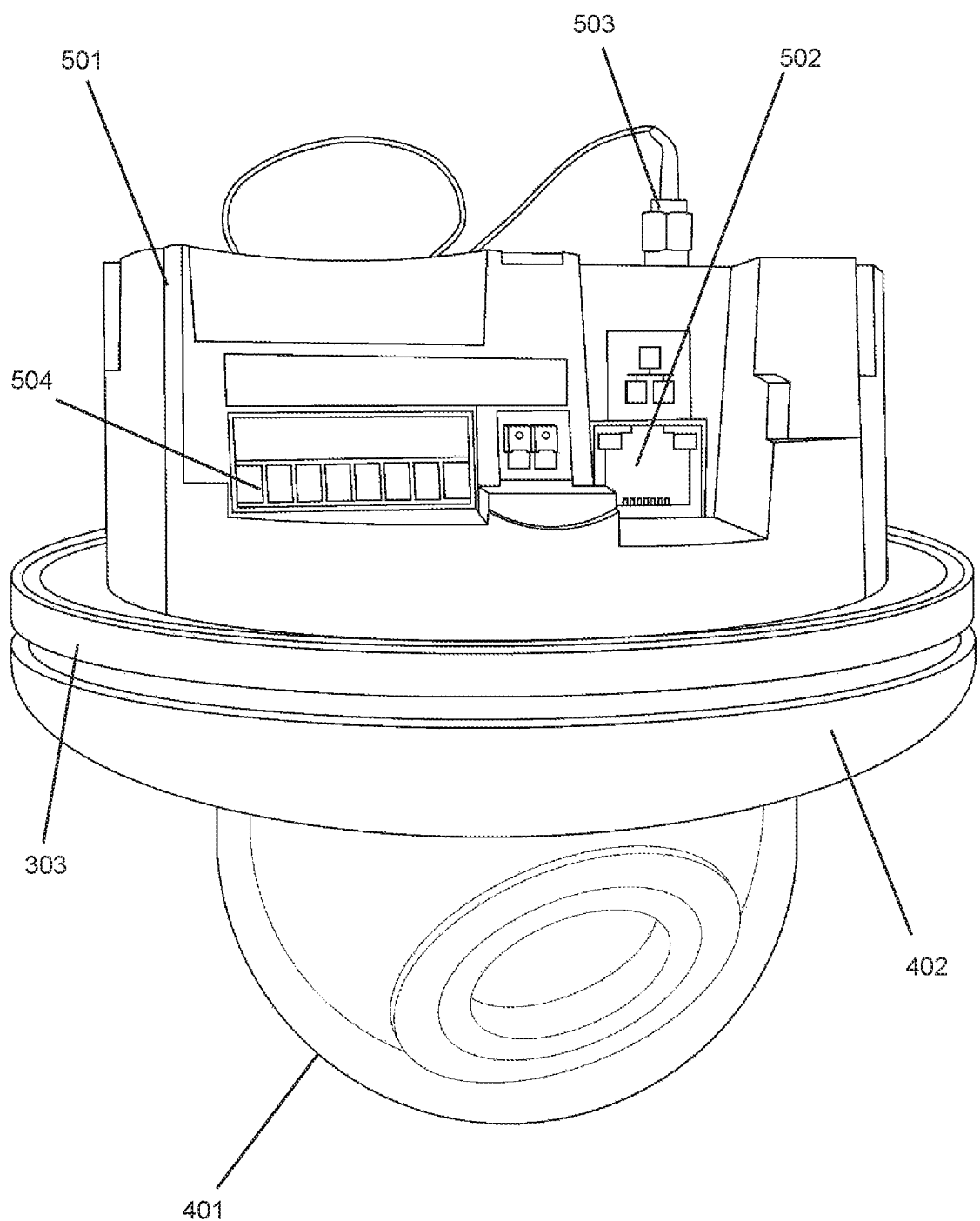
FIG. 5 is a side view of the tracking device of FIG. 3 with a clear dome attached and showing the middle housing above the base and camera.

Each tracking device 102 is typically installed in the ceiling of a zone. FIG. 5 shows a side view of an embodiment of a tracking device 102 in the orientation in which it would be installed in a ceiling. A camera assembly 304 (see FIG. 3) is shown inside a clear dome 401. The camera assembly 304 is attached to a base 303 by a collar or cover 402. A housing 501 containing electronics is above and attached to the base 303. The electronics in the housing are electrically connected to the camera assembly 304 to control the camera assembly 304 and to receive data from the camera assembly 304. The housing 501 provides a power connector 504 and an Ethernet connector 502 (e.g. an RJ-45 connector). An antenna connection 503 is also shown. When installed in a ceiling, the entire housing 501 is recessed into the ceiling and the upper portion of the base 303 abuts the lower part of the ceiling with the camera assembly 304 and dome extending below the ceiling.

Referring to FIG. 1, in a preferred embodiment, the camera assembly 304 includes a camera 105, one or more lights 107, and one or more passive infrared (PIR) sensors 106. In addition to the camera assembly 304, the tracking device 102 also includes a tracking device processor 108, a microphone or mic 104, a speaker 114, and an antenna 103. The tracking device processor 108, which is housed in the housing 501, includes a main circuit board (PCB) with a computer processor and electronics to control the lights 107 and the passive infrared sensors 106, and to receive data from the passive infrared sensors 106, camera 105, mic 104 and antenna 103, as well as to transmit audio to the speaker 114.

Figure 3:
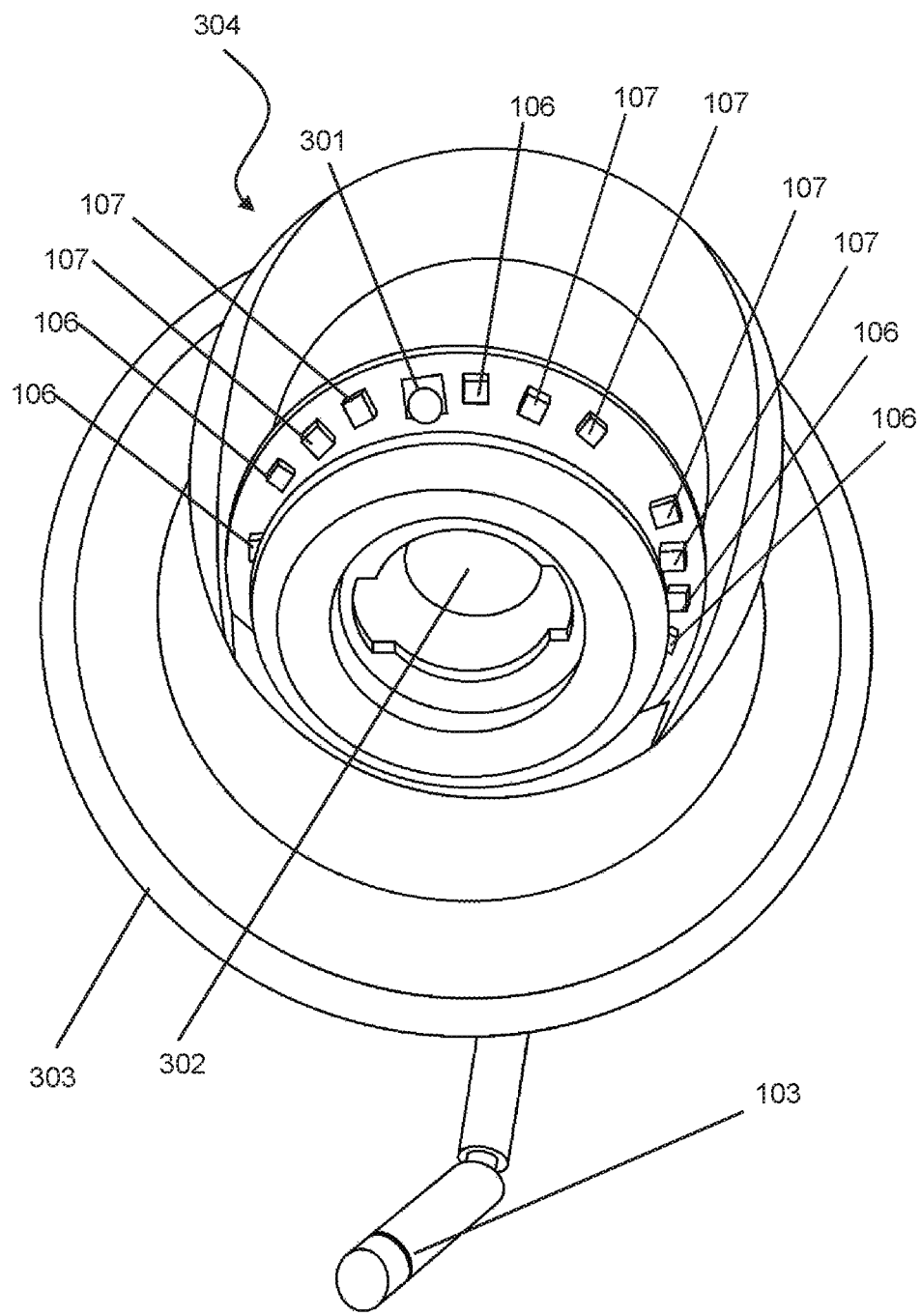
FIG. 3 is a perspective view of one tracking device without a dome attached showing the camera, passive infrared sensors, lights and antenna.
Figure 4:
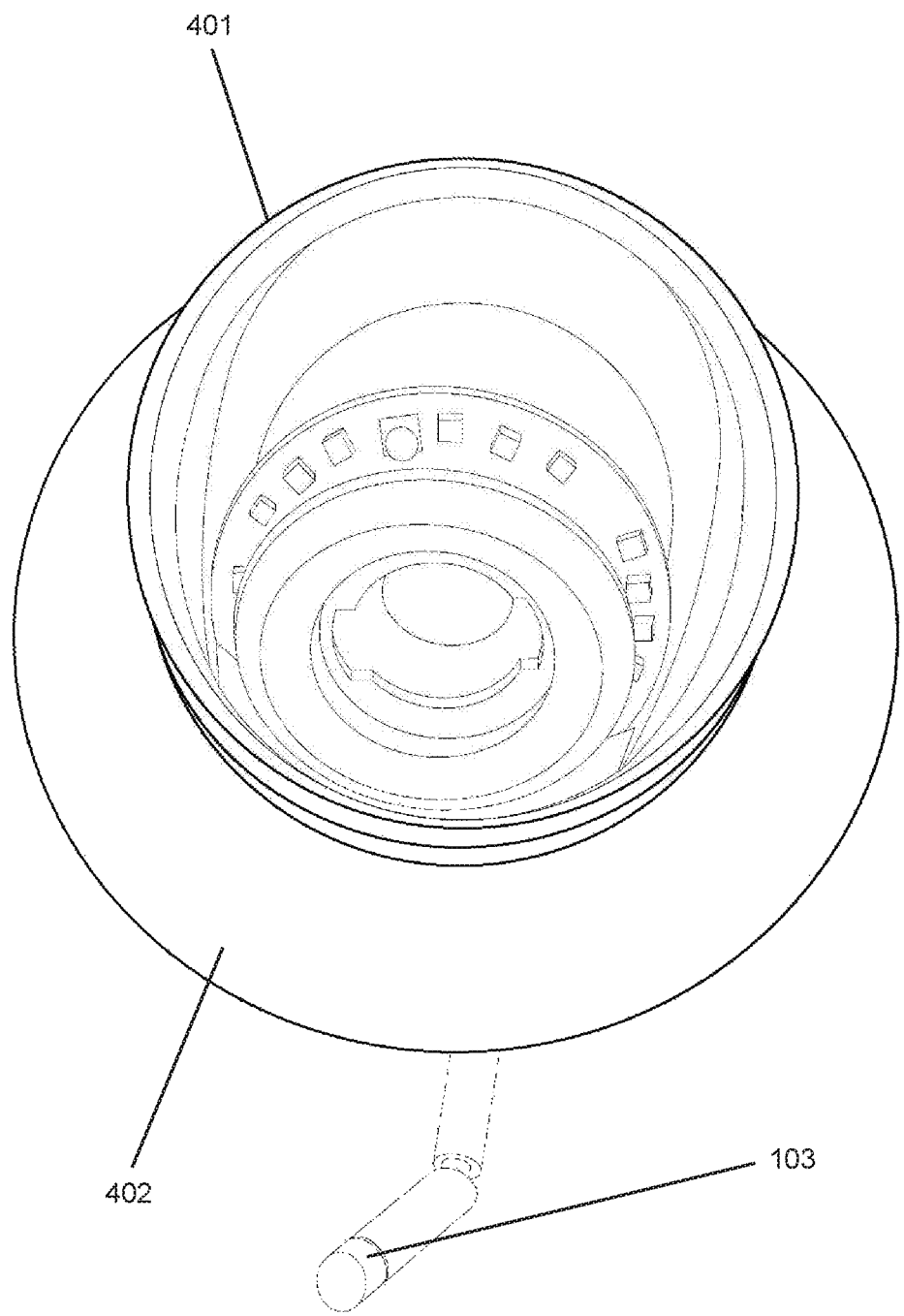
FIG. 4 a perspective view of the tracking device of FIG. 3 with a clear dome attached.

In the preferred embodiment shown in the figures, the antenna 103 is a Wi-Fi antenna, as shown in FIG. 3, which is connected to the tracking device processor 108 via a connector 503 and is configured to receive Wi-Fi signals from mobile devices 101, such as smartphones, carried by people located in the zone in which the tracking device 102 is installed. The camera 105 is any suitable digital video camera. The lens 302 of the camera is configured to have a field of view that covers most or all of the zone in which the tracking device 102 is installed. In some embodiments, the camera assembly may be fixed, and in others it may be rotatable, relative to the base and/or ceiling to which the tracking device 102 is attached, for example under control of the tracking device processor 108, to support monitoring of larger zones.

The camera 105 includes a photocell sensor 301 for sensing the light level in the zone and is configured to capture video imagery of the zone in which it is installed. In the embodiment shown in FIG. 3, the camera assembly 304 includes five passive infrared sensors 106 and six white light-emitting diode (LED) lights 107, where the passive infrared sensors 106 and white LEDs 107 are positioned around the lens 302 so that when the white LEDs 107 are turned on, they illuminate the zone and the field of view of the camera, and so that the passive infrared sensors 106 detect infrared radiation emitted in the zone and the field of view of the camera. The passive infrared sensors 106 are configured to detect the presence and motion of people 100 in the zone even in the absence alight in the zone. Fewer or more passive infrared sensors 106 and white LED lights 107 may be employed. In addition to white LED lights, one or more infrared LEDs may also be employed. Although embodiments with one PIR sensor 106 and one white LED light are possible, it is preferred to have multiple (e.g. 4 or more) of each surrounding the lens 302 of the camera for optimal performance. It is also not essential that the LED lights be white as other colors may be used, although white is generally preferred.

Each tracking device 102 is connected via a network switch 109 to a central tracking system 111, which incorporates a central tracking processor. The central tracking system 111 is generally connected to one or more display devices 110 and user input is received via typical devices, such as a keyboard, mouse, touch screen and microphone, which may be part of the central tracking system 111. The user 112 may be, for example, a security guard using the system to monitor all the zones in which tracking devices 102 are installed. The central tracking system 111 may be a personal computer or a more advanced workstation.

All the hardware components of the system are preferably standard off-the-shelf components that are commercially available. The hardware components of the camera assembly 304 and tracking device 102 are combined in the novel manner described herein, with software running on the tracking device processor 108 to perform the monitoring functions that will be described. The tracking device processor 108 includes a computer processor, and may include multiple computer processors. For example both a general purpose processor and a digital signal processing (DSP) processor may be employed where the general purpose processor handles device control and communication and the DSP processor handle video analysis.

Figure 2:
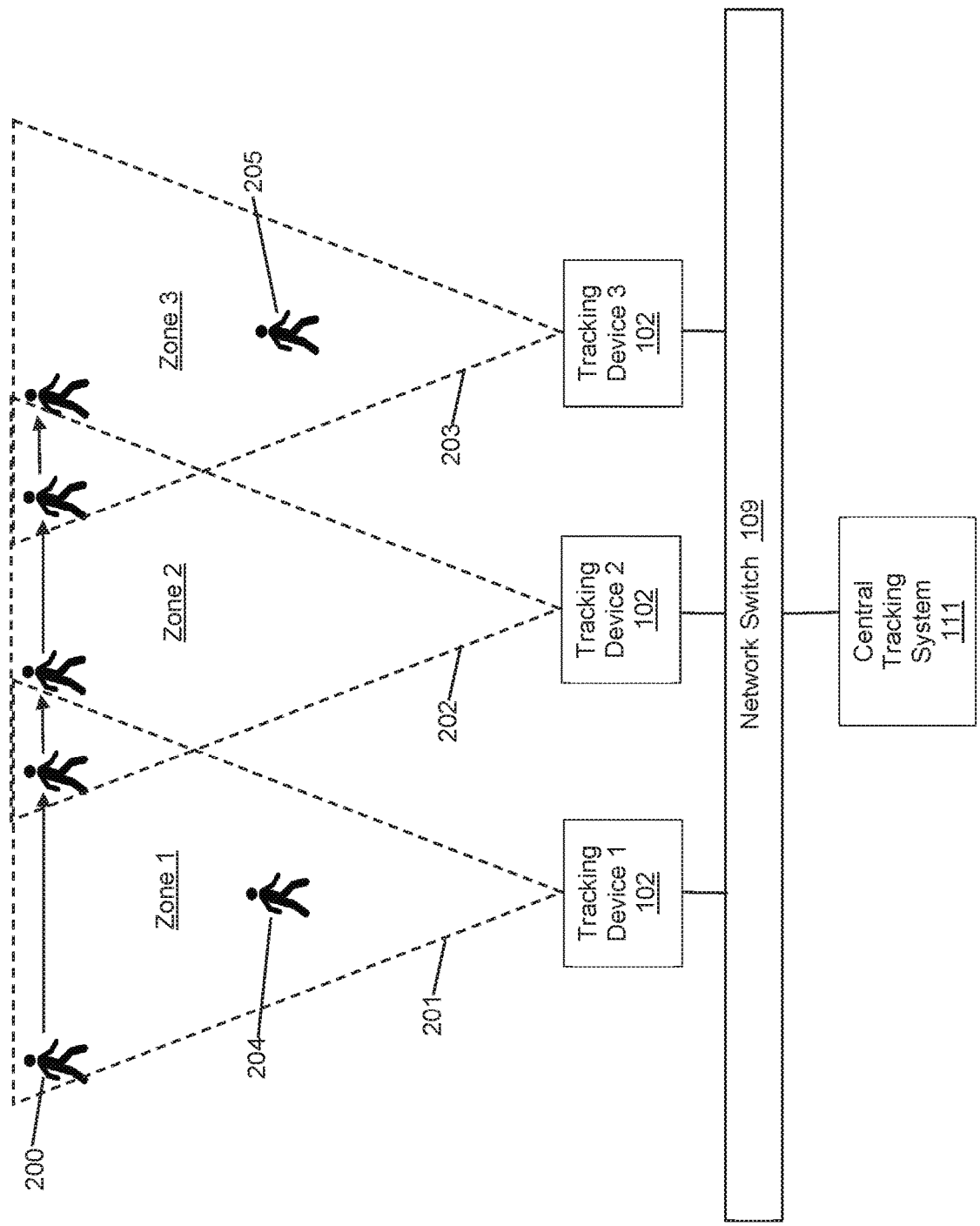
FIG. 2 depicts three tracking devices, each in communication with a central tracking system, where each tracking device monitors one zone in which people are present from time to time.

FIG. 2 depicts a simple example where the system 113 includes three tracking devices 201 and a central tracking system 111. Tracking device 1 monitors zone 1 201. Tracking device 2 monitors zone 2 202. Tracking device 3 monitors zone 3 203. In this example, zone 1 overlaps somewhat with zone 2, and zone 2 overlaps somewhat with zone 3. In FIG. 2, a first person 200 is depicted in five positions as the first person 200 moves from zone 1 to zone 2 to zone 3. A second person 204 is located in zone 1 and a third person 205 is located in zone 3. The system is configured to operate independently of lighting available in the zones, and can operate where all or some of the zones are lighted and where some or none of the zones have any light source other than the light 107 provided by the tracking device 102 in the zone.

In general, it is assumed herein that each person who enters any of the zones is carrying a mobile device 101 that is configured to wirelessly broadcast a unique identifier of the mobile device 101. Typically, this is the media access control (MAC) address of a smartphone that is periodically transmitted via as is normally done when a smartphone has Wi-Fi enabled. In some cases the unique identifier may be broadcast via another wireless protocol, such as Bluetooth and the system 113 has a Bluetooth antenna/receiver. Rather than a smartphone, the mobile device carried by a person may be a custom transmitter device, particularly in the case of employees working in a monitored facility. For example, employees may be required by management to carry or wear a custom transmitter device provided by their employer. Such a device may be comparable in size to a credit card (e.g. 0.5 mm thick) and may be carried by the employee or worn as a badge, for example. Such a custom transmitter device may be constructed inexpensively using off the shelf components such as a Wi-Fi transmitter chipset and a rechargeable battery. The custom transmitter device may be configured to transmit a unique identifier periodically, such as every five seconds, as an example. Such custom transmitter devices may be employed in other situations also, such as by providing them to patients in a hospital or installing them in shopping carts.

When a person enters the zone of a tracking device 102, the tracking device 102 can recognize that the person has entered in three separate ways. First, the tracking device 102 can receive the unique identifier of the mobile device 101 carried by the person via its antenna 103. Second, the PIR sensors 106 can determine that a person has entered the zone based on the infrared radiation emitted from the person. Third, the tracking device processor 108 obtains video data from the camera 108 and, when there is sufficient light in the zone, software running on the tracking device processor 108 analyzes the video data to segment objects in the video and identifies objects that are likely to be people, using known image analysis techniques. In cases where there is insufficient light to perform video analysis initially when a person enters the zone, the determination by the PIR sensors 106 and/or the detection of a unique identifier of a mobile device 101 in the zone may be used by the tracking device processor 108 software to cause the tracking device processor 108 to turn on the lights 107 to illuminate the zone so as to permit video analysis of the video data provided by the camera 105. In a preferred embodiment, whenever the presence of a person in the zone is detected by the PIR sensors 106 or by reception of a unique identifier of a mobile device 101 when the light level in the zone is less than a predetermined level, then the lights 107 are turned on by the tracking device processor 108 so that the tracking device processor 108 can then analyze video from the camera 105 to identify the presence and location of a person in the zone.

The tracking device processor 108 can then track the person as the person moves in the zone using known video analysis techniques and the tracking device processor 108 may keep the lights 107 turned on as long as the person remains in the zone. The central tracking system 111, to which the video of the zone collected by the camera 105 is transmitted, alternatively may analyze the video over time and track the position of a person in the zone after that person was first detected.

When a person is detected in a zone, the tracking device processor 108 in the zone provides to the central tracking system 111 a notification that a person is in the zone and also provides the unique identifier of any mobile devices 101 detect at the same time in the zone. Each tracking device processor 108 also informs the central tracking system 111 when a person has left the zone and also indicates what mobile device unique identifiers, if any, are still present in the zone at that point.

When a person is first detected in a zone, the central tracking system 111 creates a personal identifier for the person. This may be an arbitrary identifier, but is preferably based on the unique identifier of the person's mobile device 101, and may simply be the unique identifier. If, initially, there is only one person and one unique identifier present in a zone, then the person can be definitively identified with the unique identifier. Similarly, if, when the person first enters the zone, a new unique identifier (i.e. that was not in the zone before the person entered) is detected in the zone at the same time, then the person can be definitively identified with the unique identifier. Other aspects of the person may also be included as part of the personal identifier, such as an estimate of the height of the person made by video analysis software running on the tracking device processor 108 or on the central tracking system 111.

In one embodiment, each mobile device unique identifier is designated to be the personal identifier for one person. If more than one mobile device unique identifier is associated with one person, such as when the video analysis determines that only one person is present, but more than one mobile device unique identifier is present in the zone, the person's unique identifier may be based on the multiple mobile device unique identifiers. If no unique identifier is associated with a person, such as when a person is detected in the zone by video analysis but no unique identifiers are detected, then the person may be assigned an arbitrary identifier, such as a serial number. The personal identifier preferably includes video analytics characterizing the person, such as an estimate of the person's height, which can facilitate tracking the person between zones.

If two people enter a first zone at the same time and two mobile device unique identifiers are also detected to have entered the first zone, then one mobile device unique identifier may be arbitrarily associated with each of the two people initially. If video analytics related to the person are also included in the personal identifiers, then initially it is possible that the wrong unique identifier is associated with each set of analytics. A personal identifier may later be modified to correct it if, for example, one person later moves to a second zone but both mobile device unique identifiers are still present in the first zone. In that case the person remaining in the first zone would be assigned a personal identifier based on both mobile device unique identifiers. The personal identifier of the other person, who does not have a mobile device 101 broadcasting a unique identifier, would then be modified to be an identifier that does not depend on the mobile device unique identifiers, such as, for example, an identifier based on some attributes of the person determined by analysis of the video, such as an estimate of the person's height. If one person moves to a second zone before the other person and one new unique identifier is simultaneously detected in the second zone, then any ambiguity as to which unique identifier is associated with which person is then resolved and the personal identifiers are updated if required.

The central tracking system 111 preferably also maintains a database of personal identifiers including unique mobile device identifiers, some or all of the unique mobile device identifiers being associated with a name of a person. For example, a company may pre-load the database with the names and mobile device identifiers of all its employees. The central tracking system 111 may add new entries to the database when a mobile device identifier that is not already in the database is identified. When a unique identifier is associated with a name in the database, the name may be incorporated into the personal identifier for the person associated with the unique identifier.

The central tracking system 111 may provide a user 112 with the ability to view video data being collected in one or more zones. The zones to be displayed may be selected by the user 112, or, for example, video for a zone may be automatically displayed when a person enters the zone. In preferred embodiments, the system displays the personal identifiers, or aspects thereof, over video of the zone. For example, where a person's name has been determined, that name may be displayed near the image of the person in the video, as well as relevant status information, such as information indicating that the person is an employee. Alternatively the people in the video may be numbered and information about the person shown separately from the video in association with the person's number, or such information may be displayed when the user selects a person in the video.

FIG. 2 depicts a simple scenario where a second person 204 is present in zone 1 201 for an extended period and a third person 205 is present in zone 3 203 for the extended period. During the extended period, a first person 200 enters zone 1 201 and moves between the zones during the extended period, as depicted in FIG. 2. We assume that each of the three people is carrying a mobile device that broadcasts a unique identifier. Then, initially, at a first time, the second person 204 is the only person in zone 1, no people are in zone 2, and the third person is the only person in zone 3. At this point, tracking device 1 will have detected the second person 204 and, if the light level was too low, will have turned on the lights 107 to illuminate zone 1 and the system will be tracking the person in the zone. The first person's personal identifier incorporates the unique identifier. The same applies to the third person 205 in respect of tracking device 3. Assuming there is no lighting, zone 2 202 will be dark at this first time as no people are present in the zone so the lights 107 of tracking device 2 will not have been turned on.

Then at a second time, later than the first time, the first person enters zone 1 201. At that time, the PIR sensors 106 of tracking device 1 will probably detect the presence of the first person in zone 1 201. The presence of the first person 204 will also probably be detected by the detection of the unique identifier of the mobile device carried by the first person 204. The presence of the first person 204 will also probably be detected by analysis of the video of the zone (noting that the lights 107 are already on in zone 1 201 if this was required when the second person 204 entered the zone). Thus the entry of the first person is probably detected in three separate ways. It must be noted that none of these detection method is foolproof, and any may fail to detect the entry of the person in certain circumstances. However, the potential reasons for failing to detect entry of the person for each type of detector are different. For example, the fact that the lighting is inadequate for the camera to detect the person does not affect the other two techniques. Similarly, if the person is wearing heavy cold clothing (e.g. having just entered from the outside when it is cold), the PIR sensors may not initially detect the person, but this does not impact the other techniques. As a result it is very unlikely that none of the three techniques will detect a person, so the probability of detecting a person entering a zone is very high.

At a third time, later than the second time, the first person 200 moves into zone 2 202, and tracking device 2 detects the first person 200, turning on the lights 107, if required. Tracking device 1 continues to track the first person 200 while the first person 200 is in the overlapping portion of zone 1 and zone 2. At the same time, tracking device 2 also tracks the first person 200, and continues to do so until the first person 200 moves out of zone 2 202. The central tracking system 111 will be receiving information about the first person 200 from both tracking devices while the first person is in the overlapping area. The tracking devices preferably also transmit an indication of the location of the person in each zone as determined by video analysis, thus allowing the central tracking system 111 to easily confirm that the information from the two tracking devices is for the same person. After the first person 200 exits zone 2 202, then if the lights 107 of tracking device 2 102 were turned on, the lights 107 will normally be turned off by the tracking device processor 108 of tracking device 2 102. When the first person 200 enters zone 3 203, tracking device 3 102 will track the person similarly as described for zone 1. The central tracking system 111 may also include a microphone so that the user 112 may establish a two-way audio link with a zone. For example, when a person enters a zone and the system cannot associate the person with a name in the database of a person authorized to be in the zone, the user 112 may turn on the speaker 112 in the zone and speak to the person in the zone, for example by saying "please identify yourself". The user 112 may then listen to the person's response captured by the mic 104 and transmitted to the central tracking system 111 where the audio is presented to the user 112 via a speaker in the central tracking system 111. In this way the person and the user 112 can have a conversation. The two-way audio communications capability may also be used, for example, for the user to make announcements to one or more (or all) zones simultaneously.

In addition to employees, when the system 113 is employed in a retail establishment, the system may be used to track customers. Return customers can be identified by comparing their personal identifier as assigned when they enter the facility to personal identifiers stored in the database. Statistics such as the number of times a person has been in the store and the amount of time spent in the store may also be maintained in the database. There are many possible uses for such data. For example, the central tracking system 111 may transmit information about a customer to a terminal at a checkout point when the system sees the person at the checkout point to instruct the terminal that the person should be treated specially in some manner, such as to provide discount coupons to the person. Further information such as the person's "points card" number and email address may also be obtained and stored in the database along with the personal identifier and related statistics.

In preferred embodiments, the tracking device 112 includes a speaker 114 and a mic 104 that are mounted separately from the camera assembly 304 so that they are outside the clear dome 401. The central tracking system 111 is configured to permit the user 112 to control the speaker 114 and mic 104. The mic 104 is preferably automatically enabled by the tracking device processor 108 when a person is detected in the zone so that audio data is transmitted to the central tracking system 111 along with video data of the zone.

In addition to lights 107 in the camera assembly 304, the tracking device 102 may include external lights, such as white LEDs, to provide better illumination of the zone when required. For example, if the tracking device processor 108 turns on the lights 107 and then determines that the light level is still too low (e.g. either by direct measurement by the photocell sensor 301 or by analysis of the video data captured by the camera 105), then the tracking device processor 108 can turn on the external lights to better illuminate the zone. External PIR sensors (i.e. not inside the clear dome 401) may optionally also be employed.

The tracking devices are preferably powered by power over Ethernet (PoE) via an Ethernet connector 501. Alternatively a direct power connection via a connector 504 may be employed.

Figure 6:
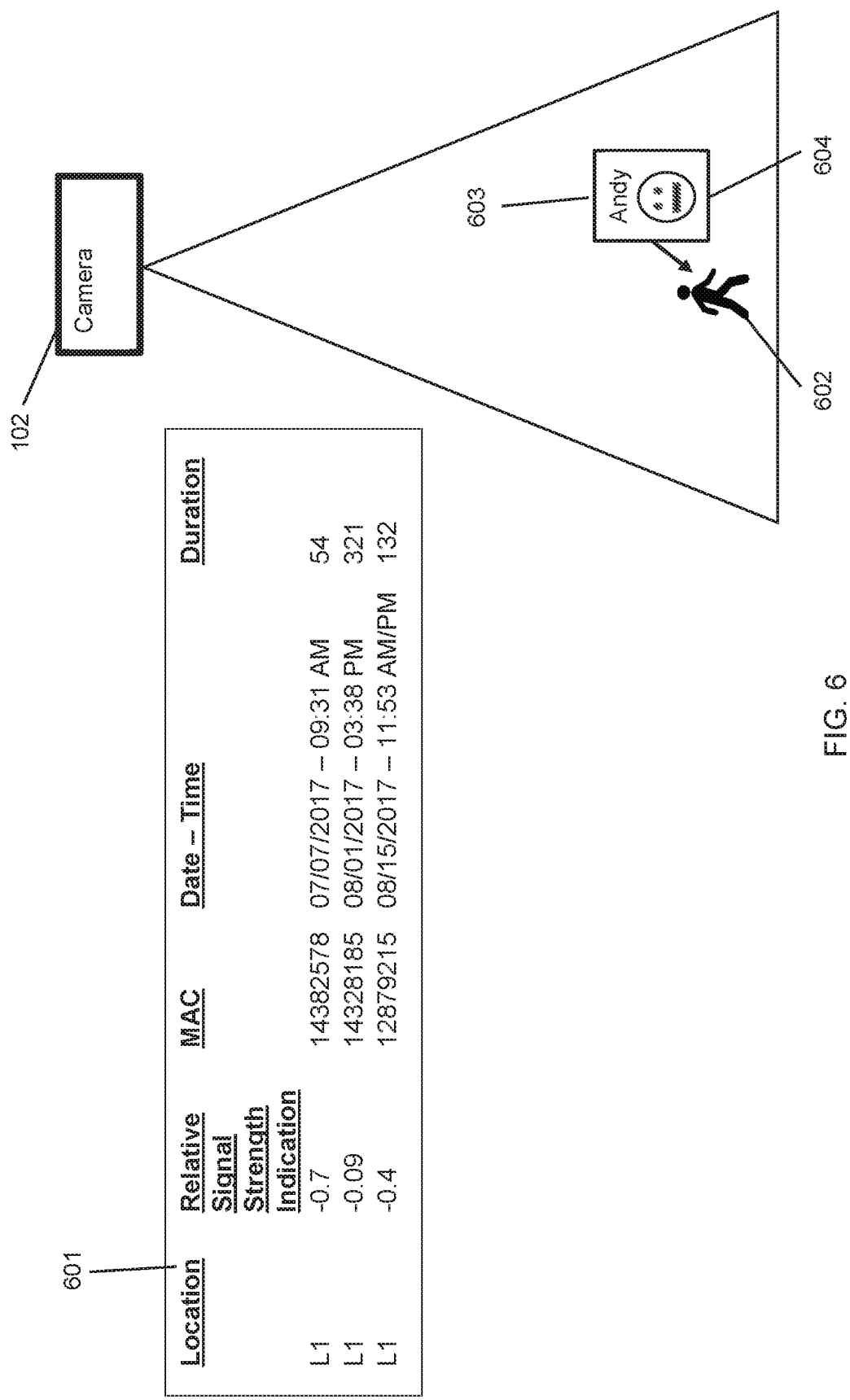
FIG. 6 shows an example screen that may be displayed to a user by the central tracking system.

FIG. 6 shows an example screen that may be displayed to a user by the central tracking system 111. This may be displayed, for example, on a display monitor 110 connected to the central tracking system 111, or remotely via the network 109. The display shows a table 601 providing information on three people who have been identified in zone L1 over a prior period. For each person the table shows the relative signal strength indication (RSSI) of the person's Wi-Fi signal and the MAC address of the person's mobile device, as well as the date/time the person entered zone L1 and the duration that the person remained in zone L1. To the right is depicted the people currently detected in the zone by the camera (i.e. tracking device) 102 in the zone. At the time shown, one person 602 is present and information about the person 603 is shown on the display. In this embodiment, the system has identified the person as being "Andy" based on information stored in the database associated with the person's mobile device, A photograph 604 of the person's head retrieved from the database is also shown under the person's name.

Figure 7:
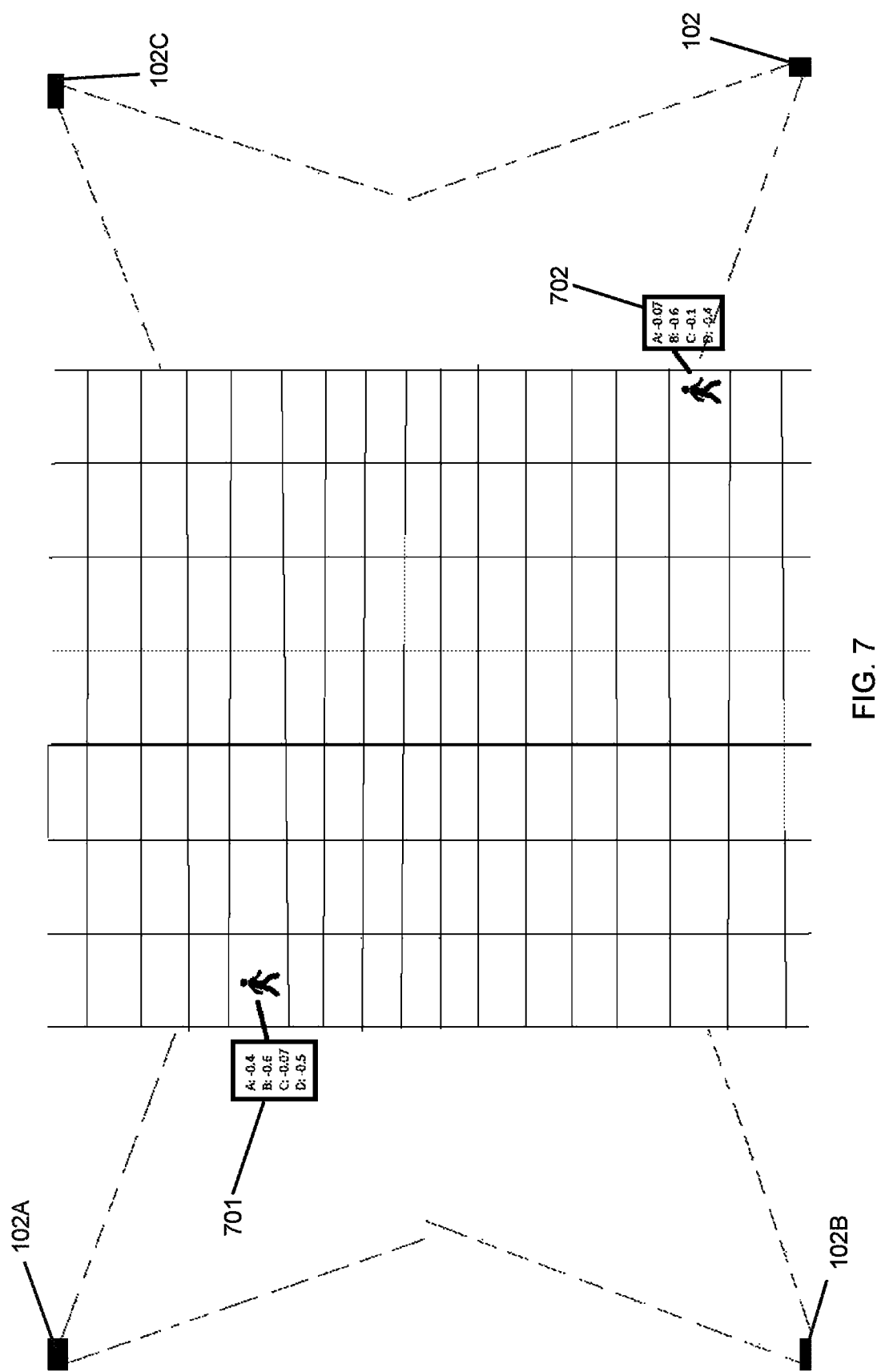
FIG. 7 shows a second example screen that may be displayed to a user by the central tracking system.

FIG. 7 shows another example screen that may be displayed to a user by the central tracking system 111. The display depicts a space being monitored, delineated by rectangles. Four tracking devices 102A-D are present in four overlapping zones in the space. Two people are currently detected in the four zones, each being monitored by each of the four tracking devices 102A-D. In this display, information 701, 702 indicating the RSSI of each person's mobile device Wi-Fi signal as received by each of the tracking devices 102A-D is displayed.

In some embodiments, the tracking devices 102 may include non-volatile storage capability. For example, each may have an SD card slot for inserting an SD card. Then video and audio captured by the tracking device 102 may be stored on the SD card. For example, a circular buffer of the latest data may be maintained in the SD card. Video may be stored at a relatively low frame rate in order to be able to store video covering an extended time period.

Generally, a computer, computer system, computing device, client or server, as will be well understood by a person skilled in the art, includes one or more than one electronic computer processor, and may include separate memory, and one or more input and/or output (I/O) devices (or peripherals) that are in electronic communication with the one or more processor(s). The electronic communication may be facilitated by, for example, one or more busses, or other wired or wireless connections. In the case of multiple processors, the processors may be tightly coupled, e.g. by high-speed busses, or loosely coupled, e.g. by being connected by a wide-area network.

A computer processor, or just "processor", is a hardware device for performing digital computations. It is the express intent of the inventors that a "processor" does not include a human; rather it is limited to be an electronic device, or devices, that perform digital computations. A programmable processor is adapted to execute software, which is typically stored in a computer-readable memory. Processors are generally semiconductor based microprocessors, in the form of microchips or chip sets. Processors may alternatively be completely implemented in hardware, with hard-wired functionality, or in a hybrid device, such as field-programmable gate arrays or programmable logic arrays. Processors may be general-purpose or special-purpose off-the-shelf commercial products, or customized application-specific integrated circuits (ASICs). Unless otherwise stated, or required in the context, any reference to software running on a programmable processor shall be understood to include purpose-built hardware that implements all the stated software functions completely in hardware.

Multiple computers (also referred to as computer systems, computing devices, clients and servers) may be networked via a computer network, which may also be referred to as an electronic network or an electronic communications network. When they are relatively close together the network may be a local area network (LAN), for example, using Ethernet. When they are remotely located, the network may be a wide area network (WAN), such as the internet, that computers may connect to via a modem, or they may connect to through a LAN that they are directly connected to.

Computer-readable memory, which may also be referred to as a computer-readable medium or a computer-readable storage medium, which terms have identical (equivalent) meanings herein, can include any one or a combination of non-transitory, tangible memory elements, such as random access memory (RAM), which may be DRAM, SRAM, SDRAM, etc., and nonvolatile memory elements, such as a ROM, PROM, FPROM, OTP NVM, EPROM, EEPROM, hard disk drive, solid state disk, magnetic tape, CDROM, DVD, etc.) Memory may employ electronic, magnetic, optical, and/or other technologies, but excludes transitory propagating signals so that all references to computer-readable memory exclude transitory propagating signals. Memory may be distributed such that at least two components are remote from one another, but are still all accessible by one or more processors. A nonvolatile computer-readable memory refers to a computer-readable memory (and equivalent terms) that can retain information stored in the memory when it is not powered. A computer-readable memory is a physical, tangible object that is a composition of matter. The storage of data, which may be computer instructions, or software, in a computer-readable memory physically transforms that computer-readable memory by physically modifying it to store the data or software that can later be read and used to cause a processor to perform the functions specified by the software or to otherwise make the data available for use by the processor. In the case of software, the executable instructions are thereby tangibly embodied on the computer-readable memory. It is the express intent of the inventor that in any claim to a computer-readable memory, the computer-readable memory, being a physical object that has been transformed to record the elements recited as being stored thereon, is an essential element of the claim.

Software may include one or more separate computer programs configured to provide a sequence, or a plurality of sequences, of instructions to one or more processors to cause the processors to perform computations, control other devices, receive input, send output, etc.

It is intended that the invention includes computer-readable memory containing any or all of the software described herein. In particular, the invention includes such software stored on non-volatile computer-readable memory that may be used to distribute or sell embodiments of the invention or parts thereof.

The abbreviation mm as used herein refers to millimetres (or in the US, "millimeters"). The abbreviation cm as used herein refers to centimetres (or in the US, "centimeters").

Where, in this document, a list of one or more items is prefaced by the expression "such as" or "including", is followed by the abbreviation "etc.", or is prefaced or followed by the expression "for example", or "e.g.", this is done to expressly convey and emphasize that the list is not exhaustive, irrespective of the length of the list. The absence of such an expression, or another similar expression, is in no way intended to imply that a list is exhaustive. Unless otherwise expressly stated or clearly implied, such lists shall be read to include all comparable or equivalent variations of the listed item(s), and alternatives to the item(s), in the list that a skilled person would understand would be suitable for the purpose that the one or more items are listed. Unless expressly stated or otherwise clearly implied herein, the conjunction "or" as used in the specification and claims shall be interpreted as a non-exclusive "or" so that "X or Y" is true when X is true, when Y is true, and when both X and Y are true, and "X or Y" is false only when both X and Y are false.

The words "comprises" and "comprising", when used in this specification and the claims, are used to specify the presence of stated features, elements, integers, steps or components, and do not preclude, nor imply the necessity for, the presence or addition of one or more other features, elements, integers, steps, components or groups thereof.

It should be understood that the above-described embodiments of the present invention, particularly, any "preferred" embodiments, are only examples of implementations, merely set forth for a clear understanding of the principles of the invention. Many variations and modifications may be made to the above-described embodiment(s) of the invention as will be evident to those skilled in the art. That is, persons skilled in the art will appreciate and understand that such modifications and variations are, or will be, possible to utilize and carry out the teachings of the invention described herein.

The scope of the claims that follow is not limited by the embodiments set forth in the description. The claims should be given the broadest purposive construction consistent with the description and figures as a whole.

What is claimed is:

1. A system for tracking the location of people as the people move between a plurality of zones in a building, each person carrying a mobile device, the system comprising:
 a plurality of tracking devices, each zone having one of the tracking devices installed therein to monitor the zone and to communicate electronically with a central tracking system, each of the tracking devices comprising:
  a digital video camera configured to capture video data of the zone in which the tracking device is installed, and configured to transmit the video data to a tracking device processor;
  a passive infrared sensor configured to detect the presence of a person in the zone;
  an antenna configured to detect wireless signals transmitted by the mobile devices carried by the people located in the zone, wherein for each mobile device the wireless signal transmitted by the mobile device specifies a unique identifier for the mobile device;
  a light configured to illuminate the zone when the light is turned on; and
  the tracking device processor configured to receive data from the digital video camera, the passive infrared sensor and the antenna, and to control the light, wherein the tracking device processor is configured to turn the light on when the passive infrared sensor detects the presence of a person in the zone, and wherein the tracking device processor is configured to analyze the video data obtained by the digital video camera to determine the location of the person in the zone; and the central tracking system comprising a central tracking processor in electronic communication with the tracking devices, wherein for each tracking device, when the tracking device processor determines that a person has entered the zone of the tracking device, the tracking device processor transmits information to the central tracking processor indicating the presence of the person in the zone and indicating the unique identifier or identifiers of one or more mobile devices in the zone, wherein the central tracking processor is configured to:

receive the information transmitted to the central tracking processor indicating the unique identifier or identifiers of the one or more mobile devices in the zone;

compare the information transmitted to the central tracking processor indicating the unique identifier or identifiers of the one or more mobile devices with previously received mobile device identifiers; and if the information transmitted to the central tracking processor indicating unique identifier or identifiers of the one or more mobile devices do not match any of the mobile device identifiers already received, create a personal identifier for the person in the zone comprising the unique identifier or identifiers of the one or more mobile devices in the zone; and track the person as the person moves between the zones in the building based on information transmitted to the central tracking processor indicating the unique identifier or identifiers of one or more mobile devices in each zone.

2. The system of claim 1, wherein for each person, the personal identifier is further based on video analytics produced by the tracking devices characterizing the person, and the central tracking processor further tracks the time and duration the person is in each zone.

3. The system of claim 2, wherein the video analytics comprise an estimate of the height of the person.

4. The system of claim 1, wherein for each person, if a plurality of mobile devices, each having a unique identifier, are present in a first zone when the person entered the first zone, and one or more of the unique mobile device identifiers were detected in the first zone before the person entered the first zone, then the personal identifier is based only on unique mobile device identifiers that were not present in the first zone before the person entered the first zone.

5. The system of claim 1, wherein for each person, if a plurality of mobile devices, each having a unique identifier, were present in a first zone when the person entered the first zone, and the tracking device in the first zone determines that one or more of the unique mobile device identifiers is no longer present in the first zone while the person remains in the first zone, then the personal identifier is modified so that it is based only on unique mobile device identifiers that were present in the first zone while the person remained in the first zone.

6. The system of claim 1, wherein the central tracking system further comprises a database containing a plurality of unique mobile device identifiers; each unique mobile device identifier being associated with a name of a person, and wherein when the central tracking processor receives information that a person has entered one of the zones and also receives information indicating the unique mobile device identifier associated with a person listed in the database has been detected in the zone, then the personal identifier for the person comprises the name of the person specified in the database associated with the unique mobile device identifier.

7. The system of claim 1, wherein the antenna is a Wi-Fi antenna, and the wireless signals are Wi-Fi signals sent periodically by smartphones, wherein each wireless signal comprises the media access control (MAC) address of the smartphone.

8. The system of claim 1, wherein, for each of the tracking devices, the tracking device processor is further configured to transmit the video data to the central tracking system while the passive infrared sensor detects the presence of a person in the zone.

9. The system of claim 8, wherein the central tracking system is further configured to selectively display the video data as the video data is received from each tracking device processor as specified by a user or according to pre-defined parameters.

10. The system of claim 8, wherein the central tracking system automatically displays video data of one of the zones after the presence of a person has been detected in the zone and also displays information derived from the personal identifier for the person.

11. The system of claim 1, wherein each of the tracking devices further comprises a microphone for capturing audio data, and the digital video camera is farther configured to transmit the audio data captured when corresponding video data is being captured to the tracking device processor along with the corresponding video data.

12. The system of claim 11, wherein each of the tracking devices further comprises a speaker, and the system is further configured to permit a user of the central tracking system to cause audio data to be played via the speaker of one or more of the tracking devices.

* * * * *